United States Patent [19]

Coats

[11] 4,319,445

[45] Mar. 16, 1982

[54] GUIDE AND DEFLECTING DEVICE

[76] Inventor: Kenneth R. Coats, R.R. 3, Odessa, Mo. 64076

[21] Appl. No.: 151,516

[22] Filed: May 19, 1980

[51] Int. Cl.³ .......................................... A01D 45/02
[52] U.S. Cl. ....................................................... 56/63
[58] Field of Search ..................... 56/53, 56, 63, 500, 56/51

[56] References Cited

U.S. PATENT DOCUMENTS

| 657,411 | 9/1900 | Hamm | 56/500 |
|---|---|---|---|
| 3,712,035 | 1/1973 | Gildersleeve | 56/63 |
| 3,717,982 | 2/1973 | Meiners | 56/63 |
| 3,827,219 | 8/1974 | Ackerman | 56/53 |
| 3,914,923 | 10/1975 | Arends | 56/63 |

Primary Examiner—Jay N. Eskovitz
Attorney, Agent, or Firm—Fishburn, Gold and Litman

[57] ABSTRACT

A device is provided for use in detasseling corn comprising tassel guides acting in conjunction with a hood to guide the tassles of the corn plant into the detasseling mechanism and deflectors to deflect the leaves of the corn plant away from the detasseling mechanism.

34 Claims, 6 Drawing Figures

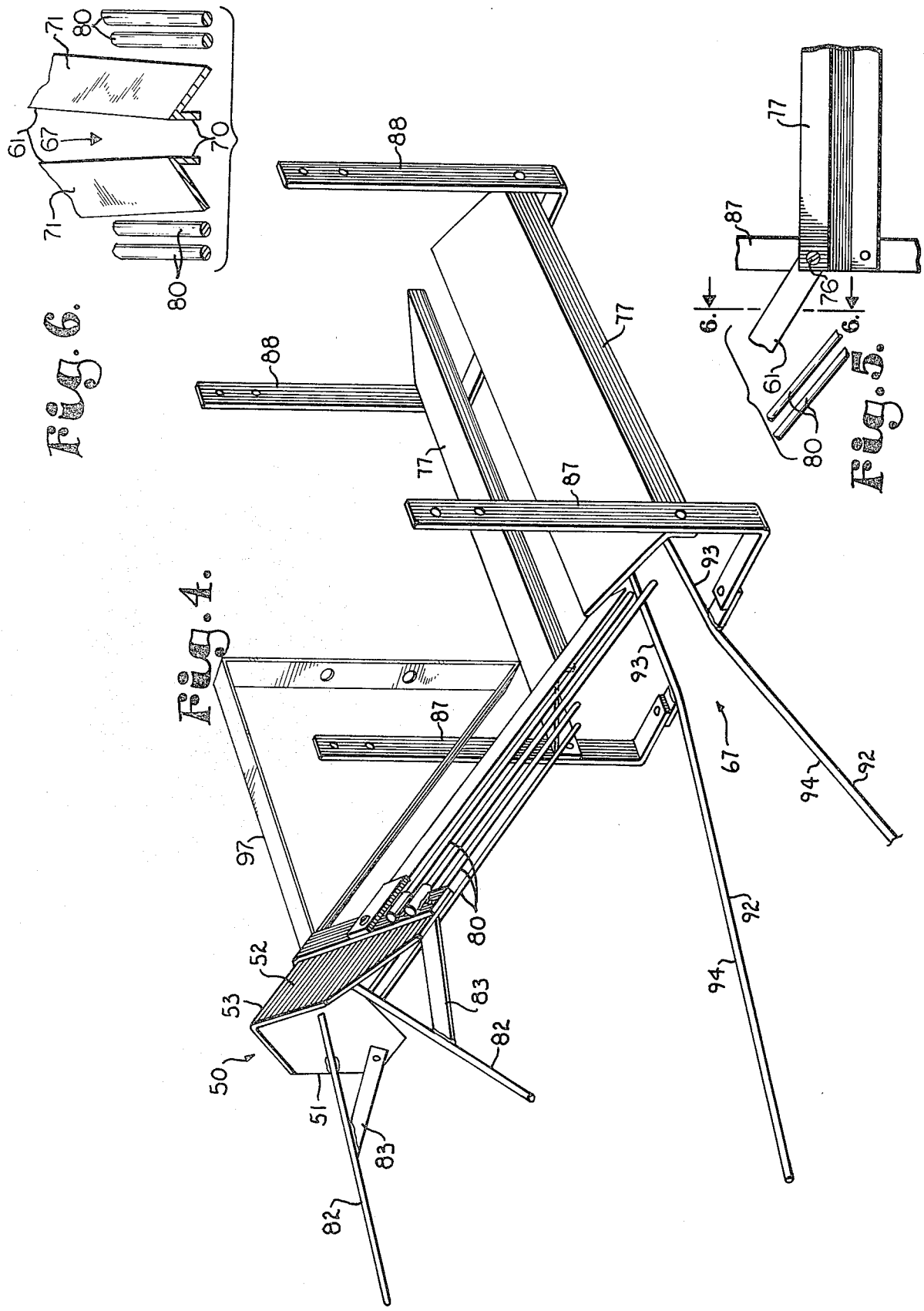

4,319,445

GUIDE AND DEFLECTING DEVICE

BACKGROUND OF THE INVENTION

The invention relates to a device for use in conjunction with a detasseling mechanism to guide certain parts of a row plant to a nipping mechanism and deflect certain other parts of the plant away from the nipping mechanism, and, in particular, this invention relates to a device for guiding tassels of corn plants into a detasseling mechanism while the leaves of the corn plant are deflected away from the detasseling mechanism.

It is essential in raising hybrid corn that the plants that are to be cross-pollinated by a second variety be detasseled so that they will receive pollen from the second variety and produce a hybrid corn. There are numerous conventional devices to accomplish this detasseling of the corn. One such device is disclosed in applicant's application Ser. No. 891,447. In order to promote the greatest growth and yield of the detasseled plant two things should occur; first, plants must be detasseled in such a manner that allows the uppermost leaves of the plant to remain unharmed, and secondly, over 99% of the tassels must be severed from the plant in any one field so that proper pollination by the second variety occurs. The percentage of severed tassels is a function of not only how well the detasseling mechanism itself works, but is also a function of the percentage of tassels that are guided into the detasseling mechanism. Therefore, what is needed in the detasseling of corn plants to assure the most economical raising of hybrid corn is a unit having a detasseling mechanism in conjunction with a tassel guide and a leaf deflecting device which functions to detassel more than 99% of the corn plants in any one field and which allows the uppermost leaves of the corn plant to remain unharmed.

One shortcoming in the prior art is that conventional devices that guide the tassels into the detasseling mechanism tend to not guide a substantial number of tassels into the detasseler. Another shortcoming is that the conventional guides, while guiding some of the tassels into the detasseling mechanism, also tend to guide the uppermost leaves of the plant into the detasseling mechanism thereby breaking these uppermost leaves away from plants and hindering the optimum growth and yield of the plant. One conventional type of guide usually consists of rods placed outwardly from the detasseling mechanism that forced all of the plant into the detasseling mechanism. Typical conventional deflectors used in conjunction with the guide consist of second pairs of rods that define a slot through which the tassel passes. If the tassel does not line up with these guide and deflector rods, the tassels are not severed and, if the leaves do line up properly, the leaves may be severed also.

OBJECTS OF THE INVENTION

Therefore, the objects of the present invention are: to provide a device which guides the tops of row plants such as corn tassels into a detasseling mechanism; to provide such a device which will deflect other portions of row plants, such as leaves, away from the detasseling mechanism; and to provide a guide and deflector device which is simple in design, easy to manufacture, capable of extended useful life, and particularly well adapted for the proposed useage thereof.

Other objects and advantages of this invention will become apparent from the following description taken in connection with the accompanying drawings wherein are set forth by way of illustration and example certain embodiments of this invention.

SUMMARY OF THE INVENTION

A guide and deflecting device is provided for use with a detasseling mechanism, such as a corn detasseler which nips the tassels of corn plants therefrom, comprising a guide member directing the corn tassel into the nipping mechanism and a deflection member deflecting the leaves of the corn plant away from the detasseling mechanism.

The guide member is comprised of a hood which is operably positioned generally forward and above the detasseling mechanism and which has two side portions angled together to form an apex at the top thereof and converging towards the detasseling mechanism from front to back thereof. Two deflector guides are opposingly attached to the rear portion of the hood and taper inwardly or converge from front to back in such a manner so as to catch the tassel and center it for the detasseling mechanism. The deflector guides are comprised of two laterally spaced and opposed sub-members having two flat surfaces at an acute angle to each other. Communicating with the rearmost lower portion of each said deflector guide is a deflector plate situated under the detasseling mechanism preventing the corn leaves from engaging therewith, thus deflecting the leaves from the detasseling mechanism. A pathway is defined transversely aligned with the hood apex between both the guides and the deflector plates for directing the tassels to the detasseling mechanism.

The drawings constitute a part of this specification and include exemplary embodiments of the present invention and illustrate various objects and features thereof.

DETAILED DESCRIPTION OF THE DRAWINGS

FIG. 4 is an enlarged perspective view of the device.

FIG. 5 is a partial side view of a connection between a guide and a deflector plate of the device.

FIG. 6 is a partial cross-sectional view of the device taken along line 5—5 of FIG. 5.

DESCRIPTION OF PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
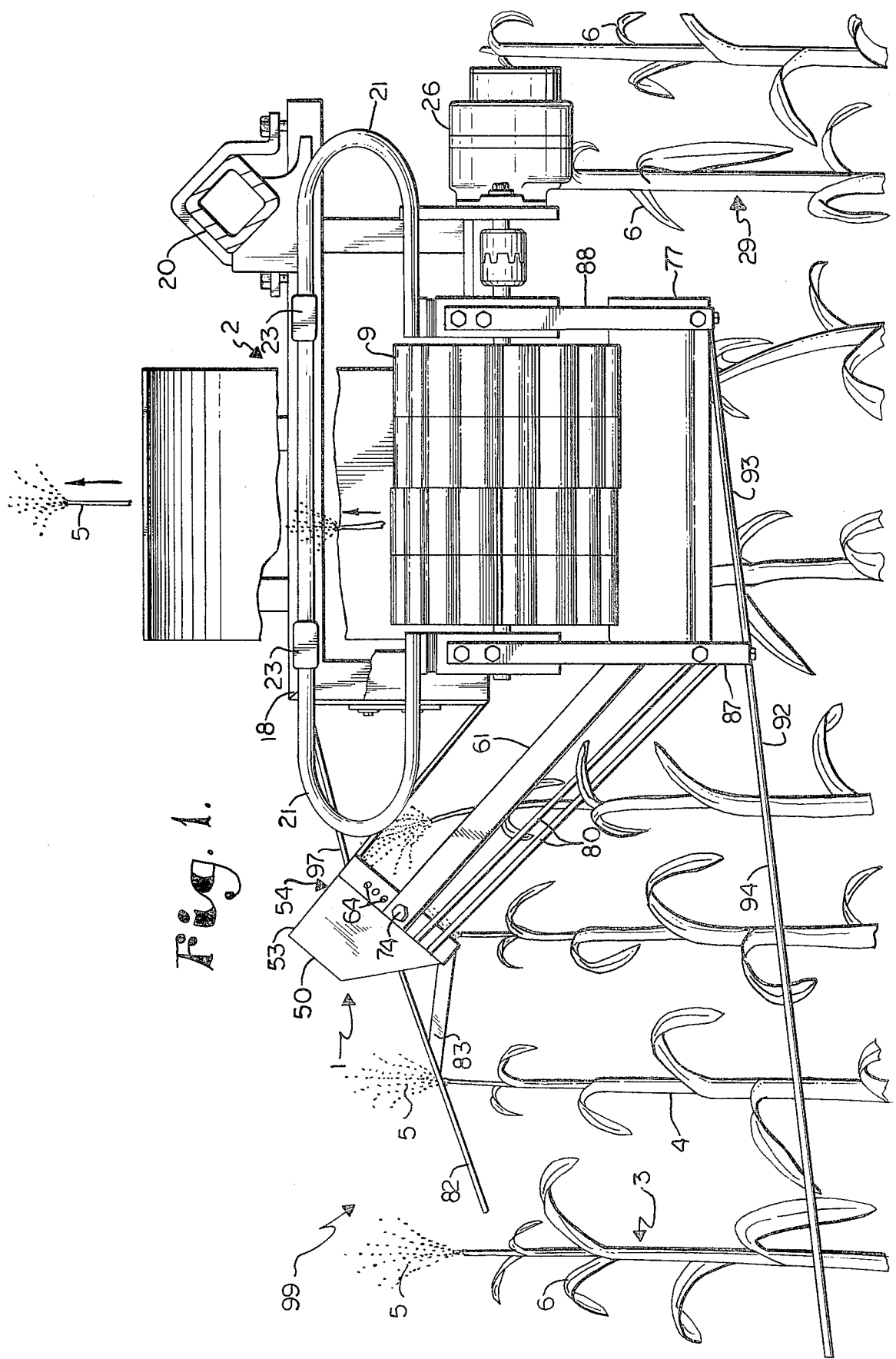
FIG. 1 is a partial side elevational view of the guide and deflector device in conjunction with a corn detasseling mechanism according to the present invention, shown removing tassels from row crops.

As used herein the terms "front" and "forward" mean to the left as seen in FIG. 1. The other directional terms used herein refer to FIG. 1, however, such terms are not meant to be limiting except where so specified herein.

Referring to the drawings, the numeral 1 generally designates a guide and deflecting device having tassel centering means and leaf deflecting means. The guide and deflecting device 1 is attached to a detasseling mechanism generally designated by the numeral 2. The detasseling mechanism 2 may be any suitable structure that is capable of selectively removing the tops or tassels of plants while not harming a substantial remaining portion of such plants. Both the guide and deflector device 1 and the detasseling mechanism 2 are propelled through a field of row crops that are planted in equally spaced rows by a locomotion means such as a tractor 7, which traverses or travels on a line of motion that is parallel to the rows of plants.

The present invention which may be used to nip the top off various row plants is illustrated detasseling corn plants 3 in FIG. 1. The corn plant 3 has a stalk 4, tassel 5, and leaves 6. Although the present invention can be adapted for use on various styles of detasseling mechanisms, the particular detasseling mechanism 2 shown, is the subject of applicant's application Ser. No. 891,447.

The detasseling mechanism 2 comprises a first roller 8 and a second roller 9 with interlocking gear-like circumferential surfaces thereof, 12 and 13 respectively, made of a material that facilitates the gripping of the tassels 5 in the nipping process. The rollers 8 and 9 are aligned side by side in parallel contacting relationship such that the circumferential surface 12 of the first roller 8 is in contact with the circumferential surface 13 of the second roller 9, thereby defining a nip therebetween generally designated as 16. The first roller 8 is attached by suitable brackets 18 to a tool bar 20 so as to be fixed in position relative thereto, while the second roller 9 is mounted on a rigid eliptical shaped member 21 that is free to pivot about a hinge or pivot point attachment 23 positioned above the rollers 8 and 9. In this manner the weight of the roller 9 gravity biases the two rollers 8 and 9 together, thus assuring constant contact and pressure therebetween at the nip 16.

An individual motor 26 is provided for each detasseling mechanism 2 and is coupled by suitable drive means to each associated first roller 8. As gravity forces the second roller 9 into contact with the first roller 8 the friction between the two cause the second roller 9 to rotate along with the first roller 8, thereby providing the necessary motive means to nip the tassels 5 from their respective corn plants 3.

Figure 3:
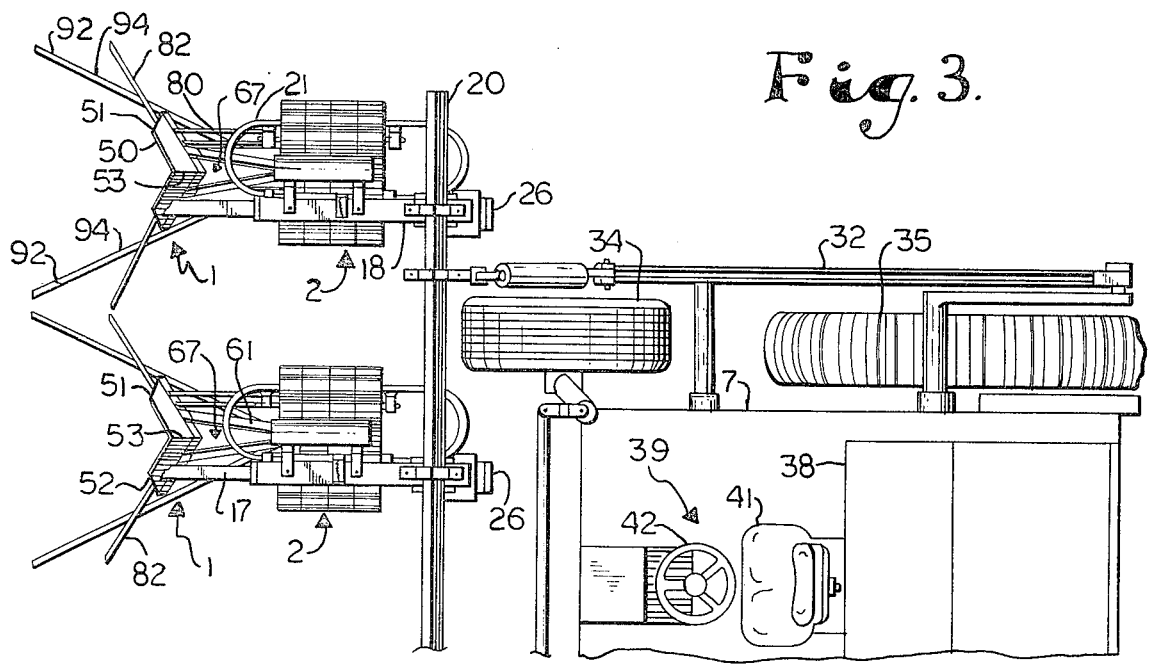
FIG. 3 is a reduced top plan view of two of the devices with associated detasseling mechanism attached to a tractor.

The tractor 7 may be any suitable tractor that is designed such that the wheel base is of a proper width to straddle the equally spaced rows of the corn plants 3, that has sufficient ground clearance so that detasseled corn plants 29 (see FIG. 1) can pass underneath the main body of the tractor 7 without damage to such plants, and that has motive means capable of varying the height of the detasseling mechanism 2 so that tassels 5 of corn plants of varying height can be nipped. As shown in FIG. 3, the tool bar 20 is preferably adapted to hold a plurality of detasseling mechanisms 2 on the tractor 7 such that the detasseling mechanisms 2 are laterally spaced therealong. The tractor 7 also has boom means 32 with associated hydraulic cylinders to raise and lower the tool bar 20, ground engaging wheel means shown here as steerable front wheels 34 and drive wheel means such as cleated rear tracks 35 motor means such as an engine located in the engine compartment 38 and an operator seating and control portion 39 with a seat 41 and steering wheel 42.

The guide and deflector device 1 comprises a hood portion 50 which has two generally flat side members 51 and 52 which are joined together so as to be angled with respect to one another. In the illustrated embodiment the side members are joined to form an angle in the nature of 90° therebetween. The hood 50 is positioned such that the side members 51 and 52 angle downwardly and divergingly from an apex 53 with each side member 51 or 52 being disposed in a generally mirror image manner to one another. The hood 50 is canted such that the apex 53 slopes downwardly from front to back, preferably in the nature of 40° from horizontal in the back, the function of which will be explained hereinafter.

The hood 50 is attached near a rear portion 54 thereof to the remainder of the device 1 by a pair of leaf deflector guides 61. One of the guides 61 extend generally rearward and downward from each of the hood side members 51 and 52 and converge slightly toward the rear thereof. Each guide 61 is attached to an associated side member 51 and 52 by means of bolts 74 or the like and are laterally spaced apart. Connector means such as the illustrated plurality of apertures 64 are positioned in the rear portion 54 of side members 51 and 52 so as to allow for the variable adjustment of the associated guides 61 thereto.

Figure 2:
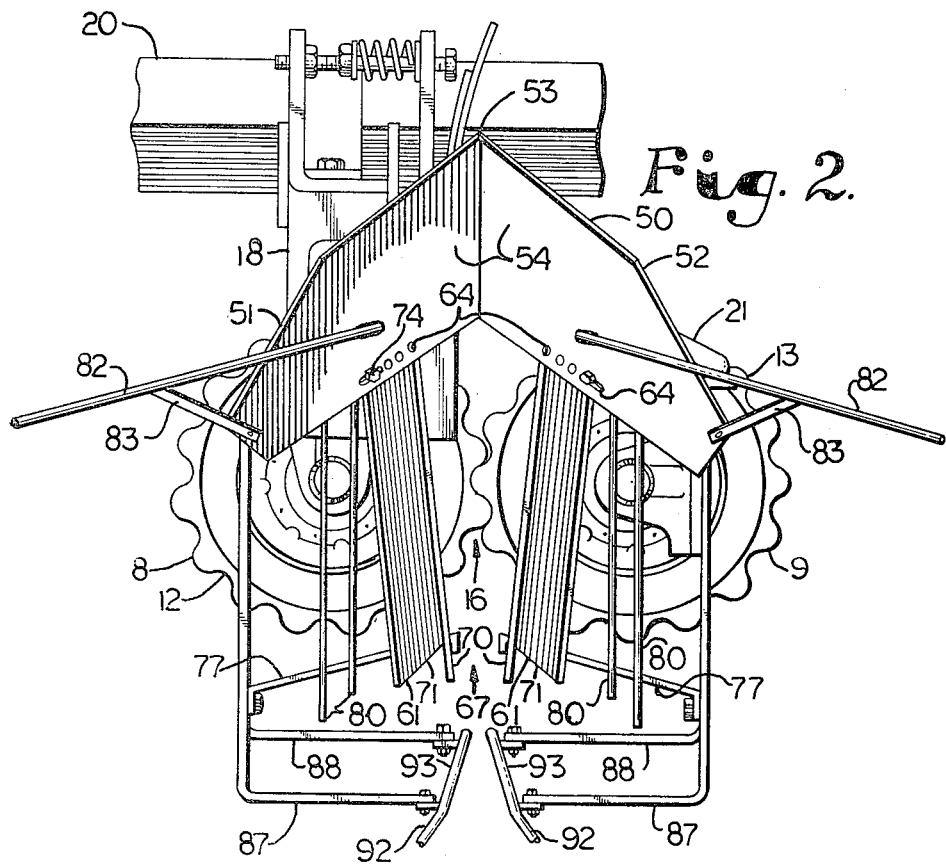
FIG. 2 is an enlarged partial front elevational view of the device and mechanism.

The guides 61 are each comprised of two sub-members 70 and 71 attached so as to form a generally acute angle therebetween. The sub-member 71 is substantially parallel to an associated hood side member 51 or 52 and the other sub-member 70 extending therefrom in a direction generally parallel to a line of motion of the tractor, as shown in FIG. 2. Preferably the sub-members 70 and 71 are substantially longer than the width thereof and are joined at an acute angle generally approaching 90° so that the sides of the members 70 and 71 defining such acute angles therebetween face outwardly in generally opposite or non facing directions. Preferably the sub-members 70 extend downward from the junction with the sub-members 71 and are each in a plane which is generally perpendicular to the tool bars 20 and slightly canted from vertical toward one another at the top portions thereof. A passageway 67 is defined between the spacing of the guides 61 through which the tassels 5 of the corn plant 3 pass to the detasseling mechanism 2. The passageway 67 is generally horseshoe shaped opening in a downwardly direction. The guides 61 are positioned to taper inwardly from front to back and along with the hood 50 slope downwardly from front to back with the sub-member 71 thereof being generally coplanar with the respective hood side member 51 and 52 thereof.

The guides 61 are attached near the rearmost portion thereof by means such as bolts 76 or the like to laterally spaced apart parallel deflector plates 77 which are generally traversely aligned and which are situated under the detasseling mechanism 2, so as to define a continuous pathway or passageway in conjunction with the passageway 67 through which the tassel 5 of the corn plant 3 can pass to the detasseling mechanism 2. The deflector plates 77 include a downwardly extending lip 78 at an edge 79 each thereof which is adjacent the passageway 67 therebetween, as shown in FIGS. 2, 4, 5 and 6. Further, as shown in FIGS. 2, 4 and 6, each deflector plate lip 78 and associated deflector guide first submember 61 define a substantially continuous leaf deflecting means. Preferably the deflector plates 77 are approximately the same length as the detasseling mechanism rolls 8 and 9 and when properly spaced have outside edges positioned so as to be approximately as wide as the detasseling mechanism.

A plurality of laterally spaced parallel leaf deflector rods 80 are attached to the hood 50 at the rear portion 54 thereof by means such as welding or the like. A pair of rods 80 are juxtaposed to and exterior each of the guides 61. The deflector rods 80 are preferably constructed of a resilient material and as shown here are cylindrical and of approximately the same length as the guides 61 and are co-planar with the guide sub-member 71 above with an associated respective side member 51 or 52. The deflector rods 80 are unattached to any other structure at a rearward distal end thereof.

A tassel guide rod or wand 82 extends forwardly from each of the side members 51 and 52 and are stationarily secured thereto by welding or the like and support brackets 83.

Attached below the guide and deflecting device 1 by U-shaped and traversely spaced brace members 87 and 88 which also serve to position the deflector plates 77 are a pair of laterally spaced apart stalk guide rods or wands 92 which extend forwardly and angle outwardly from the remainder of the guide deflector 1. The wands 92 have first portions 93 which are situated under the detasseling mechanism 2 and are vertically spaced from the deflector plates 77 so as to co-define the passageway therebetween and second portions 94 which angle outwardly from the forwardmost side of the detasseling mechanism 2 and forwardly in a plane slightly canted downwardly from the horizontal at the front thereof.

In use, the guide and deflecting device 1 is attached by triangular bracket 97 and the brackets 87 and 88 to the detasseling mechanism 2 in such a manner that the passageway 67 defined by the deflector guides 61 is traversely aligned with the nip 16 of the detasseling mechanism 2. The height of the detasseling mechanism 2 along with the guide and deflector device 1 is adjusted so that just the tassels 5 of the corn plant 3 will be engaged by the hood 50 of the device 1. The height of the detasseling mechanism 2 may be continuously adjusted by an operator according to plant 3 height as a planted field 99 is crossed.

Referring to FIG. 1, as the tractor progresses through the field 99 the stalk guide wands 92 engage the corn stalks 4 forcing each such stalk to converge to a center of the plant rows and toward the passageway 67 so as to align with the detasseling mechanism nip 16. The stalk guide wands 92 typically direct plant leaves 6 as well as tassels 4 toward the detasseling mechanism 2. The tassel guide wands 82 engage the tassels 5 of the plant 3 and urge the tassels 5 toward the hood 50. The guide and deflecting device 1 is preferably positioned at such a height so as to allow engagement between the hood 50 and tassels 5 of the plant but not the leaves 6. As the tractor 7 moves forwardly tassels 5 which are laterally spaced from the center of the row and thus not centered to engage the detasseling mechanism nip 16 engage the hooded portion 50 thereby typically bending the tassels 5 slightly forward and, because of the geometric design of the hood 50 and the fact that the hood 50 angles downwardly from front to back, centering the tassels 5 along the apex 63 which is aligned with the passageway 67 and therefore also the nip 16. After the tractor 7 has moved forward enough for the tassel 5 to be centered into the passageway 67, the leaves 6 engage the deflector rods 80 and are urged downwardly and engage the guides 61. The guide sub-member 70 generally tends to prohibit the leaves 6 from entering the passageway 67. In addition, as the tractor 7 continues to move forwardly, the leaves 6 are deflected downward by the guides 61 and deflector rods 80 so as to pass under the deflector plates 77. Lips 78 further prevent the leaves 6 from engaging the nip 16. The deflector rods 80 tend to deflect the outer portions of the leaves 6 prior to their engagement with the guides 61 so that numerous leaves do not accumulate at the guides causing some to overflow into the passageway 67. The deflector plates 77 tend to prohibit engagement of the leaves 6 with the rollers 8 and 9 of the detasseling mechanism 2. At this time, the tassel 5 engages the detasseling mechanism 2 at the nip 16 severing the tassel 5 from the plant 3. As the tractor 7 passes the tassel 5 is removed and discarded as described, yet the plant 3, the stalk 4, and substantially all the leaves 6 are left unharmed to produce a maximum yield.

It is to be understood that while certain forms of the present invention have been illustrated and described herein, it is not to be limited to the specific forms or arrangement of parts herein described and shown.

What is claimed and desired to secure by Letters Patent is as follows:

1. A guide and deflecting device for use with a detasseling mechanism in the removal of tops of plants having leaves and being disposed in rows having equal spacing therebetween and where the detasseling mechanism has a nip and is positioned on a tractor means adapted for traveling in a line of motion parallel the rows of plants; said device comprising:
    (a) tassel centering means engageable with tops of successive plants and adapted for placement before the detasseling mechanism; said centering means having a pathway therethrough aligned such that laterally spaced plant tops are centered and directed toward the detasseling mechanism;
    (b) leaf deflecting means to urge the plant leaves away from the detasseling mechanism; and wherein;
    (c) said deflecting means includes a leaf deflector guide secured to said device on opposed sides of said pathway, said guides each including a substantially vertical and generally flat first sub-member extending forwardly therefrom in a direction generally parallel with the tractor line of motion, said guide first sub-member engaging the leaves of said plants and deflecting them from said pathway.

2. A device as in claim 1 wherein:
    (a) said centering means comprises a hood.

3. A device as in claim 2 wherein said hood comprises:
    (a) first and second generally flat side members joined at an upper end thereof to form an angle therebetween at an apex thereof; and wherein:
    (b) the hood is positioned such that the apex is traversely aligned relative to the motion of the tractor with the nip in the detasseling mechanism; and
    (c) the hood angles downwardly from front to back whereby the tops of said plants are urged towards the apex of the hood and toward alignment with the nip in the detasseling mechanism and said deflector guides are attached to a rear portion of said hood and extend rearwardly therefrom.

4. The device as set forth in claim 3 wherein:

(a) said deflector guides converge inwardly relative to said pathway from front to back thereby defining a tapered passageway for tassels therebetween.

5. A device as in claim 4 including
(a) a pair of deflector rods; one of said deflector rods being attached at a frontward end thereof to the rear portion of each of said hood side members respectively outwardly from said deflector guides relative to said pathway; and
(b) a pair of leaf deflector plates attached to a rearward end of said deflector guides and being positioned under the detasseling mechanism.

6. A device as in claim 5 wherein:
(a) each deflector guide comprises said first and a second sub-member; each sub-member is generally flat with a greater length than width; the sub-members are joined together along the length thereof to form an angle therebetween.

7. A device as in claim 6 wherein:
(a) said angle between said first and second sub-member is an acute angle; and
(b) sides of associated first and second sub-members defining said angles therebetween opens outwardly in generally non facing directions such that the plant leaves are urged by said sub-members away from between said deflector guides.

8. A device as in claims 3, 5, or 7 wherein:
(a) each of said deflector guides is attached to said rear portion of one of said hood side members respectively at locations generally equidistant from said hood apex; and wherein:
(b) planes which contain each of said deflector guide first sub-members are generally perpendicularly aligned with respect to transverse orientation;
(c) each of said deflector guide second sub-members extends generally outwardly from an associated one of said first sub-members;
(d) each of said deflector guide second sub-members is generally co-planar with an associated hood side member; and wherein:
(e) said deflector guides are positioned to converge inwardly from front to back thereby defining a tapered passageway for tassels therebetween; said centering means pathway comprising said passageway; said passageway being aligned with and between said hood apex and the detasseling mechanism nip.

9. A device as in claim 8 wherein:
(a) said deflector guides are attached to said respective hood side members by adjustable connector means to allow the adjustability of the width of said passageway therebetween.

10. A device as in claim 9 wherein:
(a) said deflector rods are in pairs associated with the end of said deflector guides; each of said deflector rods being cylindrical, resilient and of approximately the same length as said deflector guides.

11. A device as in claim 10 wherein:
(a) each of said deflector rods is attached at one end thereof to each of said hood side members at points exterior to an associated said deflector guide so as to be juxtapositioned with respect to an associated deflector guide and to be generally co-planar with each respective hood side member.

12. A device as in claim 11 wherein:
(a) said deflector plates include a generally flat portion having a substantially rectangular shape with the length approximately equal the length of the detasseling mechanism and the width of each deflector plate portion being such that when positioned in spaced relationship to each other under the detasseling mechanism, the combined width separating outer edges of the deflector plates is approximately equal to the width of the detasseling mechanism.

13. A device as in claim 12 wherein:
(a) each of said deflector plates is attached near the frontward end thereof to a rearward end of an associated deflector guide; said deflector plates are laterally spaced apart, and spaced underneath said detasseling mechanism; and said deflector plates are attached to said detasseling mechanism such that the passageway defined by said deflector guides is extended between said deflector plates thereby allowing and directing a tassel to pass through the guide and deflecting device to the nip of the detasseling mechanism.

14. A device as in claim 7 wherein:
(a) each of said deflector guides is attached to said rear portion of one of said hood side members respectively at locations generally equidistant from said hood apex; and wherein:
(b) each of said deflector guide second sub-members extends generally outwardly from an associated one of said first sub-members; and
(c) each of said deflector guide second sub-members is generally co-planar with an associated hood side member.

15. A device as in claim 14 wherein:
(a) said deflector guides are attached to said respective hood side members by adjustable connector means to allow the adjustability of the width of a forward portion of said passageway.

16. A device as in claim 15 wherein:
(a) said deflector rods are in pairs associated with the end of said deflector guides; each of said deflector rods being cylindrical, resilient and of approximately the same length as said deflector guides; and
(b) each of said deflector rods is attached at one end thereof to each of said hood side members at points exterior to an associated deflector guide so as to be juxtapositioned with respect to an associated deflector guide and to be generally co-planar with each respective hood side member.

17. The device as set forth in claim 5 wherein:
(a) each of said deflector plates comprise a substantially planar member positioned below an associated roller of said detasseling machine;
(b) said plates are spaced apart defining a passageway therethrough, said passageway aligned with said detasseling machine nip and said pathway between said leaf deflector guides.

18. In combination:
(a) a detasseling mechanism having a nip therein; said detasseling mechanism being adapted for attachment to locomotion means for traversing rows of plants having upper tassels and leaves in a line of motion; said nip being adapted for engaging the tassels and removing same from the plants;
(b) tassel centering means engageable with tops of successive plants and adapted for placement before the detasseling mechanism; said centering means having a pathway therethrough aligned such that laterally spaced plant tops are centered and directed toward the detasseling mechanism;

(c) deflecting means to urge the plant leaves away from the detasseling mechanism; and wherein:
(d) said deflecting means includes a leaf deflector guide secured to said device on opposed sides of said pathway, said guides each including a generally flat first sub-member extending forwardly therefrom in a direction generally parallel with the line of motion; each of said first sub-members being positioned forward of said detasseling machine; said guide first sub-member engaging the leaves of said plants and deflecting them from said pathway.

19. A device as in claim 18 wherein:
(a) said centering means comprises a hood.

20. A device as in claim 19 wherein said hood comprises:
(a) first and second generally flat side members joined at an upper end thereof to form an angle therebetween at an apex thereof; and wherein:
(b) the hood is positioned such that the apex is traversely aligned relative to the motion of the tractor with the nip in the detasseling mechanism; and
(c) the hood angles downwardly from front to back whereby the tops of said plants are urged towards the apex of the hood and toward alignment with the nip in the detasseling mechanism, and said deflector guides are attached to a rear portion of said hood and extend rearwardly therefrom.

21. The device as set forth in claim 20 wherein:
(a) said deflector guides are positioned to converge inwardly from front to back thereby defining a tapered passageway for tassels therebetween.

22. A device as in claim 21 including;
(a) a pair of deflector rods; one of said deflector rods being attached at a frontward end thereof to the rear portion of each of said hood side members respectively outwardly from said reflector guides relative to said pathway and;
(b) a pair of leaf deflector plates attached to a rearward end of said deflector guides and being positioned under the detasseling mechanism.

23. A device as in claim 22 wherein:
(a) each deflector guide comprises said first and a second sub-member, each sub-member is generally flat with a greater length than width; the sub-members are joined together along the length thereof to form an angle of less than 180° therebetween.

24. A device as in claim 23 wherein:
(a) sides of associated first and second sub-members defining said angle therebetween open outwardly in generally non facing directions such that the plant leaves are urged by said sub-members and away from between said deflector guides.

25. A device as in claim 20, 22, or 24 wherein:
(a) each of said deflector guides is attached to said rear portion of one of said hood side members respectively at locations generally equidistant from said hood apex; and wherein:
(b) planes which contain each of said deflector guide first sub-members are generally perpendicularly aligned with respect to transverse orientation.
(c) each of said deflector guide sub-members extends generally outwardly from an associated one of said first sub-members;
(d) each of said second deflector guide sub-members is generally co-planar with an associated hood side member; and wherein:
(e) said deflector guides are positioned to converge inwardly from front to back thereby defining a tapered passageway for tassels therebetween; said centering means pathway comprising said tapered passageway; and said passageway being aligned with and between said hood apex and the detasseling mechanism nip.

26. A device as in claim 25 wherein:
(a) said deflector guides are attached to said respective hood side members by adjustable connector means to allow the adjustability of the width of said passageway therebetween.

27. A device as in claim 26 wherein:
(a) said deflector rods are in pairs associated with the end of said deflector guides; each of said deflector rods being cylindrical, resilient and of approximately the same length as said deflector guides.

28. A device as in claim 27 wherein:
(a) each of said deflector rods is attached at one end thereof to each of said hood side members at points exterior to said an associated deflector guide so as to be juxtapositioned with respect to an associated deflector guide and to be generally co-planar with each respective hood side member.

29. A device as in claim 28 wherein:
(a) said deflector plates include a generally flat portion having a substantially rectangular shape with the length approximately equal the length of the detasseling mechanism and the width of each deflector plate portion being such that when positioned in spaced relationship to each other under the detasseling mechanism, the combined width separating outer edges of the deflector plates is approximately equal to the width of the detasseling mechanism.

30. A device as in claim 29 wherein:
(a) each of said deflector plates is attached near the frontward end thereof to a rearward end of an associated guide; said deflector plates are laterally spaced apart, and spaced underneath said detasseling mechanism; and said deflector plates are attached to said detasseling mechanism such that the passageway defined by said deflector guides is extended between said deflector plates thereby allowing and directing a tassel to pass through the guide and deflecting device to the nip of the detasseling mechanism.

31. A device as in claim 24 wherein:
(a) each of said deflector guides is attached to said rear portion of one of said hood side members respectively at locations generally equidistant from said hood apex; and wherein:
(b) each of said deflector guide sub-members extends generally outwardly from an associated one of said first sub-members; and
(c) each of said second deflector guide sub-members is generally co-planar with an associated hood side member.

32. A device as in claim 31 wherein:
(a) said deflector guides are attached to said respective hood side members by adjustable connector means to allow the adjustability of the width of said passageway therebetween.

33. A device as in claim 32 wherein:
(a) said deflector rods are in pairs associated with the end of said deflector guides; each of said deflector rods being cylindrical, resilient and of approximately the same length as said deflector guides; and
(b) each of said deflector rods is attached at one end thereof to each of said hood side members at points exterior to said associated deflector guide so as to be juxtapositioned with respect to an associated deflector guide and to be generally co-planar with each respective hood side member.

34. The device as set forth in claim 22 wherein:
(a) each of said deflector plates comprises a substantially planar member positioned below an associated roller of said detasseling machine;
(b) said plates are spaced apart defining a passageway therethrough, said passageway aligned with said detasseling machine nip and said pathway between said leaf deflector guides.

* * * * *